Sept. 23, 1969     C. C. RYAN     3,469,197
AUTOMATIC PULSE AMPLITUDE TRACKING CIRCUIT
Filed Dec. 4, 1959     2 Sheets-Sheet 1

Sept. 23, 1969  C. C. RYAN  3,469,197
AUTOMATIC PULSE AMPLITUDE TRACKING CIRCUIT
Filed Dec. 4, 1959  2 Sheets-Sheet 2

INVENTOR
Charles C. Ryan
BY Maury I. Hull
ATTORNEY

United States Patent Office 3,469,197
Patented Sept. 23, 1969

3,469,197
AUTOMATIC PULSE AMPLITUDE TRACKING CIRCUIT
Charles C. Ryan, Glen Burnie, Md., assignor to Westinghouse Electric Corporation, Pittsburgh, Pa., a corporation of Pennsylvania
Filed Dec. 4, 1959, Ser. No. 857,330
Int. Cl. H03k *17/60*
U.S. Cl. 328—150                                11 Claims This invention relates to improvements in pulse amplitude tracking circuits, and more particularly to a pulse amplitude tracking circuit which will automatically select a periodic pulse signal of a given amplitude from an input signal waveform which may consist of many other periodic and random pulse signals and follow the amplitude variations of the selected pulse signal as a function of time.

In summary, the apparatus of the invention employs a biased diode to which the input signal is applied, the diode being biased in accordance with an adjustable servo voltage and passing only the portions of pulses which exceed the servo voltage in amplitude. An error signal is maintained at zero by constantly adjusting the level of the servo biasing voltage so that the servo voltage tends to differ from the pulse amplitude by a constant amount.

A primary object of the invention is to provide a new and improved pulse amplitude tracking circuit.

Another object is to provide a new and improved pulse amplitude tracking circuit which will follow amplitude variations of a selected signal in the presence of other periodic and random signals.

These and other objects will become more clearly apparent after a study of the following specification when read in connection with the accompanying drawings, in which.

Figure 1:
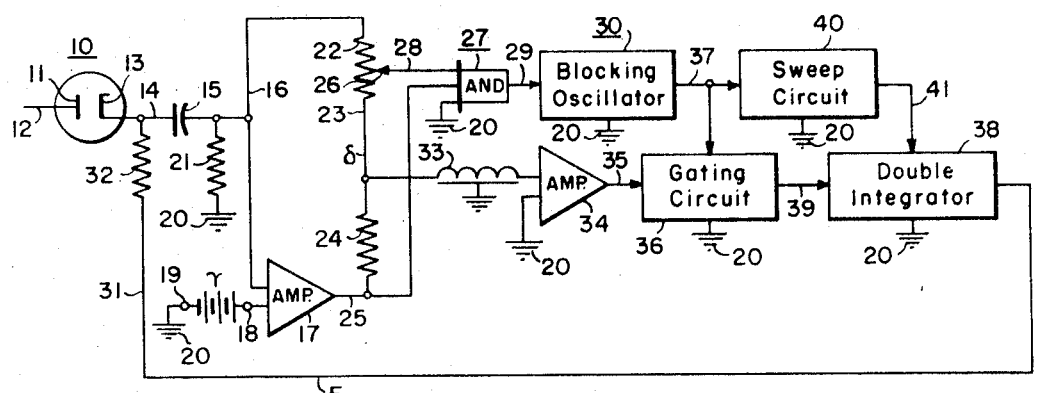
FIG. 1 is a schematic electrical circuit diagram partially in block form of the preferred embodiment of the invention.

Referring now to the drawings for a more detailed understanding of the invention, and in particular to FIG. 1 thereof, there is shown at 10 a diode having an anode 11 to which is connected a lead 12. The pulses to be selected and tracked are applied to the lead 12 and are of a positive polarity in accordance with the arrangement of elements in the diode 10. It will be understood that pulses of negative polarity could be utilized by the apparatus of the invention, suitable rearrangement of parts being made in a manner which will be apparent to one skilled in the art. The diode 10 has a cathode 13 which is connected by way of lead 14, capacitor 15 and lead 16 to supply an input to an amplifier 17. The amplifier 17 also has connected to the input thereof a terminal 18, and the terminal 18 has a complementary terminal 19 connected to ground 20. Between the terminals 18 and 19 is applied a constant signal or potential for establishing a threshold, the signal having a value $\gamma$ (gamma) which be explained more fully hereinafter and which will be utilized in equations hereinafter provided for describing the operation of the apparatus in greater detail. The $\gamma$ signal at terminals 18 and 19 may be provided by any suitable means including the source shown. The aforementioned lead 16 is connected by way of resistor 21 to ground 20 and is also connected by way of potentiometer 22, lead 23 and resistor 24 to an output lead 25 of amplifier 17. The potentiometer 22 has an arm 26 which is provided for purposes which will be hereinafter apparent. The resistance value of resistor 24 is preferably equal to the total resistance value of potentiometer 22. Lead 23 as will be seen hereinafter, has an error signal $\delta$ (delta) developed thereon. In a manner which will be more fully described hereinafter, the value of error signal $\delta$ varies between positive and negative polarities, and the arm 26 of potentiometer 22 is preferably adjusted whereby $\delta$ has upper and lower limits of $$\frac{\gamma}{2} \text{ and } -\frac{\gamma}{2}$$

while the servo loop is closed, the loop being opened while the positive or negative values of $\delta$ exceed these limits. It should be understood that even when the servo loop is "closed" a steady value of biasing potential E is maintained on lead 31 while the error signal is zero.

An "and" circuit, which may be of conventional design, is provided and is shown in block form at 27, the "and" circuit being connected by lead 28 to the aforementioned potentiometer arm 26 to receive an input therefrom, the "and" circuit 27 also having the signal of lead 25 applied thereto as a second input. The "and" circuit 27 provides an output on lead 29 to a blocking oscillator 30 only when the input from the potentiometer arm 26 is positive at the same time that a negative pulse is received on lead 25 from the output of amplifier 17. For any other condition the "and" circuit does not provide an output to the blocking oscillator so that the blocking oscillator does not fire, it being understood that the blocking oscillator 30 is fired or triggered only when an output is received on lead 29 from the "and" circuit. As will be explained more fully hereinafter, a negative input is supplied to the "and" circuit on lead 25 whenever the signal level on input lead 12 exceeds a value $E+\gamma$, where E is the value of a servo output voltage on lead 31 which is connected by way of resistor 32 to the aforementioned cathode 13 of diode 10. As will be seen hereinafter, in accordance with the adjustment of arm 26 a positive pulse on lead 28 is provided whenever the input signal level on input lead 12 has a value between E and a value $E+\gamma+2\epsilon$, where $\epsilon$ (epsilon) represents the portion of the amplitude of pulse 5 of curve B of FIG. 2 which exceeds the voltage E plus $\gamma$, the total pulse amplitude of pulse 5 having a value $e=E+\gamma+\epsilon$, as shown in FIG. 2.

The aforementioned error signal $\delta$ on lead 23 is supplied by way of a delay line 33 to an amplifier 34. The output of the amplifier 34 is supplied by lead 35 to a gating circuit shown in block form at 36. The gating circuit 36 may be of conventional design and is gated by the output of the blocking oscillator 30 applied thereto on lead 37, and while a gating pulse is applied to circuit 36 pulses on the output lead 35 of amplifier 34 are passed by lead 39 to a double integrator circuit shown in block form at 38. The output of the double integrator 38 is applied to the aforementioned lead 31 and is a voltage having a value corresponding to E, for reasons which will be more clearly apparent hereinafter. The output of the blocking oscillator 30 is also applied to a sweep circuit 40 which has the output thereof applied to the double integrator 38 by lead 41 and thence to lead 31. The sweep circuit is provided for applying a sweeping voltage to the double integrator 38 which will cause a sweeping voltage on lead 31 which in turn will cause wide variations in the bias voltage at cathode 13 upon occasion in order to provide for proper circuit operation under certain conditions, as will be explained hereinafter.

Figure 2:
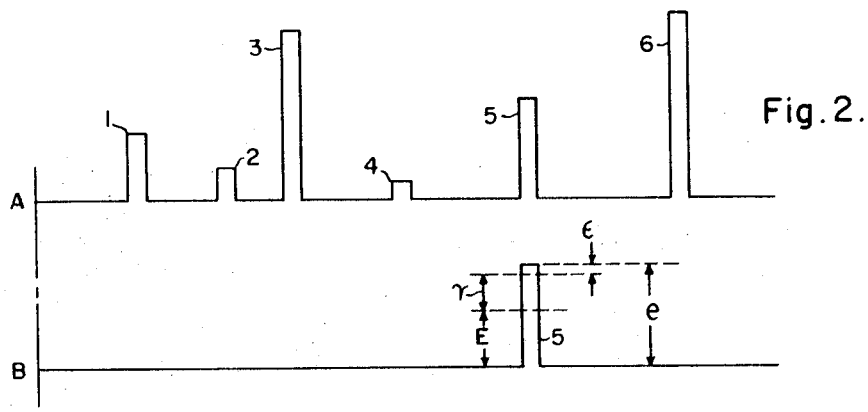
FIGS. 2, 3 and 4 are graphs illustrating the operation of the apparatus of FIG. 1.
Figure 3:
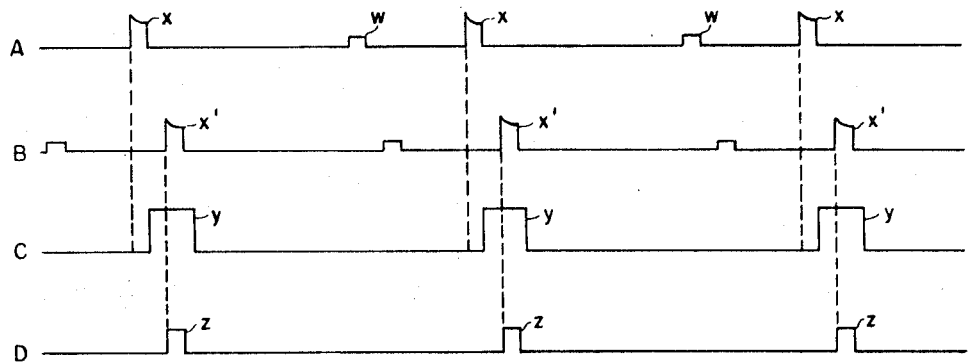
Figure 4:
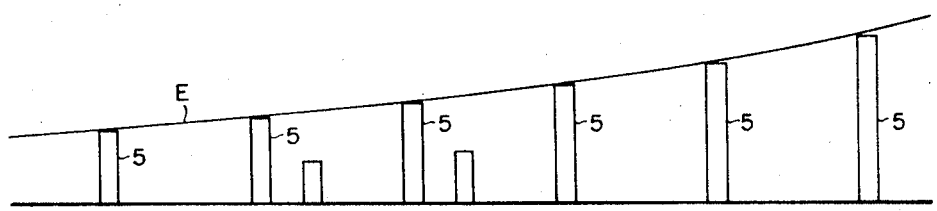

Particular reference should be made now to FIGS. 2, 3 and 4 for a description of the operation of the circuit of FIG. 1. The graph A of FIG. 2 illustrates a waveform consisting of 6 pulses. Each of these pulses may belong to a separate periodic signal or individual periodic signals and some may be random. Assume for purposes of description that pulse 5 belongs to a particular periodic signal and that it is desired to track in ampliutde the periodic signal to which pulse 5 belongs. As previously stated, the total amplitude of the pulse 5 may for the purposes of description be divided into parts E, $\gamma$ and $\epsilon$ as shown on curve B, the pulse 5 having a total amplitude $e$.

Assume for purposes of explanation that the output of the servo is at the voltage level E. Then the only signals that pass through the diode are the portions of those pulses which exceed E. Assuming that only pulse 5 is present, the portion of pulse 5 which exceeds E is $\gamma+\epsilon$, and this portion is applied to the top of potentiometer 22. The phase inverting amplifier 17 with a gain A and a threshold setting of $\gamma$, applies a potential $-A\epsilon$ to the bottom end of resistor 24. The sum of these two voltages is the error signal $\delta$.

$$\delta = \frac{\gamma+\epsilon}{2} - \frac{A\epsilon}{2}$$

where resistors 22 and 24 have the same values.

The tracking loop operates in such a manner as to maintain the error signal $\delta=0$ by adjusting the value of voltage E to a level which differs from the amplitude $e$ of the input signal or pulse 5 by a constant amount $\gamma+\epsilon$. It will be understood that in curve B of FIG. 2 $\gamma$ and $\epsilon$ are exaggerated in size for purpose of clarity of illustration. None of the other pulses of curve A of FIG. 2 affects the operation of the apparatus since the loop is opened when these pulses are present. If pulse 5 is moving in such a manner that its amplitude coincides with another pulse, the operation of the double integrator will in most cases prevent the second signal from interrupting the tracking action with respect to pulse 5. The function of the delay line 33 interconnected between lead 23 and amplifier 34 is to delay the error signal just long enough so that the blocking oscillator pulse can be developed for the gating action.

In FIG. 3, to which particular attention is directed, the pulses $x$ of curve A represent the error signal pulses $\delta$ resulting from the pulses of the signal which it is desired to track, while the pulses $w$ represent other undesired pulses. It will be understood that, since the servo operates to reduce the error signal $\delta$ to zero, the amplitudes of the error signal pulses may vary slightly from pulse to pulse under certain conditions of operation. The error signal $\delta$ has a negative polarity while the pulses on lead 12 are increasing in amplitude, and $\delta$ has a positive polarity while the pulses on lead 12 are decreasing in amplitude. In curve B of FIG. 3 these error signal pulses are shown delayed by the delay line 33 as they appear at the input to amplifier 34 and are designated $x'$. At the same time that the pulses $x$ are developed on lead 23 inputs are applied by leads 28 and 25 to the aforementioned "and" circuit 27 and after a brief time interval the blocking oscillator 30 is operated to supply gating pulses $y$ of curve C of FIG. 3, these gating pulses being applied by lead 37 to the gating circuit 36 coincident with the pulses $x'$ on lead 35 which are passed to the lead 39 and thence to the double integrator 38. The pulses on lead 39 represented by curve D of FIG. 3 are designated $z$.

Particular reference should be made now to FIG. 4. It should be noted that the curves of FIGS. 3 and 4 are not to the same time scale. Assume for purposes of illustration that the periodic signals to which pulse 5 of curve B of FIG. 2 belongs is gradually increasing in amplitude as shown in FIG. 4, then the polarity of the error signal $\delta$ is negative. This error signal, after polarity or phase inversion in amplifier 34, is applied to the double integrator 38 where it may be inverted twice again, and results in the value of the output voltage E from the double integrator 38 appearing on lead 31 increasing as shown in FIG. 4, it being understood that the rate of increase is exaggerated for clarity of illustration.

Certain other conditions of operation should be noted. As previously stated, if the potentiometer arm is adjusted for asymmetrical error signal curve, if the pulse on lead 12 increases from its former steady value by an amount $\epsilon$, an error signal of $$-\frac{\gamma}{2}$$

is generated, whereas if the pulse on lead 12 decreases from its former steady value by an amount $\epsilon$, an error signal of $$+\frac{\gamma}{2}$$

is generated. A too great and too sudden increase in pulse amplitude on lead 12 results in the potentiometer arm 26 going negative, and the servo loop opens. A too sudden and too great decrease in pulse amplitude on lead 12 results in the output of amplifier 17 going to zero thereby opening the loop. Potentiometer arm 26 may be adjusted to widen or narrow the amplitude range within which the error signal may vary without opening the servo loop.

Figure 5:
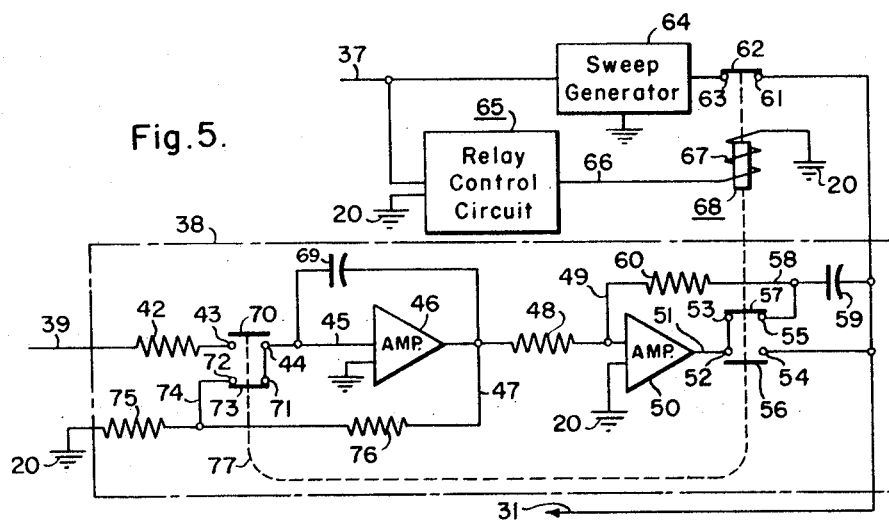
FIG. 5 is a schematic circuit diagram of a portion of the invention according to a second embodiment thereof.

Particular reference should be made now to FIG. 5 in which details of a suitable double integrator circuit and a sweeping circuit arrangement controlled by the blocking oscillator are shown. In FIG. 5 the double integrator 38 is shown enclosed in the dashed lines. In FIG. 5, lead 39 from the gating circuit 36, FIG. 1, is seen to be connected by way of resistor 42 to a relay contact 43. A cooperating relay contact 44 is connected by way of lead 45 to supply an input to an integrating amplifier 46. The output of the amplifier 46 as developed on lead 47 is applied by way of resistor 48 and lead 49 to a second integrating amplifier 50; the output of amplifier 50 is applied by lead 51 to a pair of additional relay contacts 52 and 53, contact 52 having a cooperating contact 54 and contact 53 having a cooperating contact 55, with armatures 56 and 57 respectively. The aforementioned contact 54 is connected to the aforementioned output lead 31. Contact 55 is connected by way of lead 58 and capacitor 59 to lead 31. Resistor 60 interconnects the input lead 49 of amplifier 50 with lead 58 which, when the relay is in an energized condition is connected by path 55–57–53 to the output lead 52 of the amplifier 51.

The aforementioned lead 31 is connected by way of relay contact 61, armature 62 and relay contact 63 to receive the output of a sweep generator 64 which has the sweep thereof controlled by the signal or the aforementioned gate on lead 37 from the blocking oscillator 30 of FIG. 1.

The signal on lead 37 is also applied to a relay control circuit shown in block form at 65, the output of which is applied by lead 66 to the winding 67 of the relay 68. The other end of the winding 67 is connected to ground 20. It will be understood that the relay control circuit 65 includes a source of potential for energizing the winding 67 of relay 68 under a preselected condition of a signal or a lack of signal on lead 37.

The aforementioned input lead 45 to integrating amplifier 46 is interconnected with the output lead 47 by way of capacitor 69. The aforementioned contacts 44 and 43 have a relay armature 70 associated therewith for closing the circuit while the relay is deenergized. Contact 44 is also connected to contact 71 having a cooperating contact 72 and an armature 73. Contact 72 is connected by way of lead 74 and resistor 75 to ground 20. The aforementioned lead 74 is connected by way of resistor 76 to the aforementioned output lead 47. Coupling means 77 operatively connects all of the aforementioned relay armatures 70, 73, 56, 57 and 62 for operation together.

In the operation of the circuit of FIG. 5, an output from the blocking oscillator 30, FIG. 1 interrupts the sweep circuit. It does this by causing the deenergization of the relay 68 with the result that the circuit is opened between contacts 61 and 63. At the same time, the circuit is closed between contacts 52 and 54, and is closed between contacts 43 and 44 so that the two integrating amplifiers 46 and 50 are effectively connected in series between lead 39 and lead 31 to provide the double integration aforedescribed.

Assume now by way of description that there is no output from the blocking oscillator 30, which means in effect that the condition in which a positive pulse on lead 28 from potentiometer arm 26 and a negative pulse from amplifier 17 on lead 25 are not simultaneously applied to the "and" circuit 27. This means in effect that the apparatus does not have a pulse to which it is "locked" for tracking purposes and it is necessary to sweep the output or voltage on lead 31 over a somewhat larger range in order to pick up the target. While there is no output from the blocking oscillator 30 relay 68 is energized to close the contacts at 61 and 63, close the contacts at 53 and 55, and also close the contacts 72 and 71; this disconnects the double integrator from the input lead 39, effectively grounding the input to the amplifier 46, and the two resistors 75 and 76 if of substantially equal value provide an integrating amplifier standby arrangement in which drift is substantially eliminated. At the same time, the resistor 60 is connected between the output and input of the amplifier 50 and a voltage is developed on the capacitor 59. The voltage on lead 31 sweeps between prescribed limits, as established by the construction or adjustment of sweep generator 64.

When a target is picked up which provides an output from "and" circuit 27, the sweep generator 64 is disconnected and the amplifiers 46 and 50 again become active.

Figure 6:
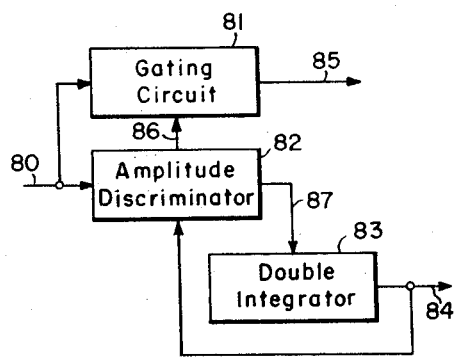
FIG. 6 is a circuit diagram in block form of one application of the invention.

Particular reference should be made now to FIG. 6. In FIG. 6 the composite video signal as represented by the curves of graph A of FIG. 2 is applied to lead 80 and thence to a gating circuit 81 and amplitude discriminator 82. One output of the amplitude discriminator (lead 87) is applied to a double integrator 83 by which automatic amplitude tracking is provided by the feedback signal on lead 84. A continuous voltage equal to E exists on lead 84 which is in turn equal to the input signal $e$ except for a small constant difference. The second output of the amplitude discriminator (lead 86) consists of a pulse which occurs in time simultaneously with the pulse signal being followed by the tracking loop. This pulse or gating signal that exists on lead 86 when applied to the gating circuit 81 provides on lead 85 a gated video signal as represented by the curve B of FIG. 2.

FIG. 6 represents an important application of the apparatus in which there is provided a continuous voltage that is equal in amplitude to the signal of interest (plus a small constant voltage) regardless of the environment of the signal, and in which there is provided a gate which occurs in time coincidence with the signal of interest. This provides a means of time modulating the composite video waveform to obtain the periodic signal of interest as a single signal for purposes of signal analysis.

The invention is particularly suitable in a number of applications including radar systems that track in angle by measuring the amplitude difference between the received signals from two antennas, for example in passive ranging and directioning systems; the apparatus provides a means of isolating a given signal from its background environment by time gating the composite video waveform with the blocking oscillator pulse. This is necessary when it is desired to analyze a particular signal as to pulse width, pulse repetition frequency, etc.

Figure 7:
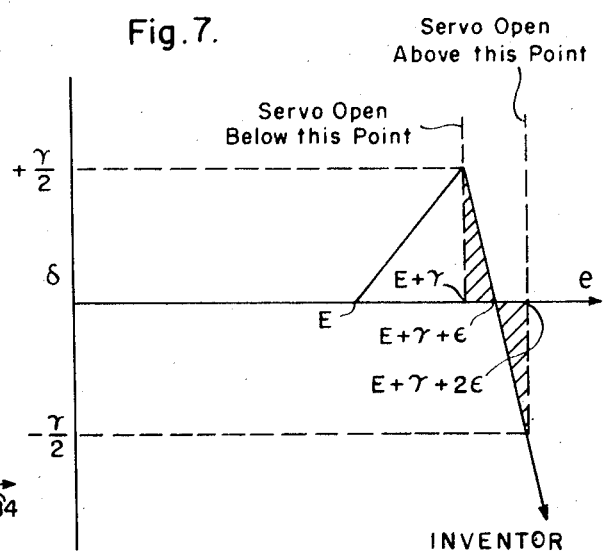
FIG. 7 a graph illustrating the adjustment of an adjustable element of the circuit of FIG. 1.

Particular reference should be made now ot FIG. 7 in which there is shown graphically various factors which influence the setting of the potentiometer arm 26 of potentiometer 22.

The operation of the tracking loop may be analyzed in greater detail as follows:

Referring to FIG. 1 and to curve B of FIG. 2, it can be seen that the error signal $\delta$ generated at lead 23 and the junction of resistors 22 and 24, where 22 has a value $R_1$ and 24 a value $R_2$, and $R_1 = R_2$, is $$\delta = \frac{\gamma + \epsilon}{2} - \frac{A\epsilon}{2}$$

where A is the gain of amplifier 17.

$$\delta_{max} = \frac{\gamma}{2} \text{ for } \epsilon = 0$$

$$\delta = 0 \text{ for } \frac{\gamma + \epsilon}{2} = \frac{A\epsilon}{2}$$

or $$\epsilon = \frac{\gamma}{A-1}$$

in order that the error curve be symmetrical it is necessary for $$\delta_{min} = -\frac{\gamma}{2}$$

$$\delta_{min} = \frac{-\gamma}{2} = \frac{\gamma + \epsilon}{2} - \frac{A\epsilon}{2}$$

or $$\epsilon = \frac{2\gamma}{A-1}$$

For optimum operation of the tracking loop it is necessary that:

(1) The error curve be linear.

(2) The error curve be symmetrical.

A plot of $\delta$ versus $e$, the input signal, with an arbitrary output E is shown in FIG. 7. The desired error curve for proper operation of the servo system is the same as the shadowed area of FIGURE 7 but $\delta$ should be zero at all other points. This is accomplished by the gating circuit (as far as the double integrator is concerned), by closing the loop only when $$E + \gamma < e < E + \gamma + 2\epsilon$$

The loop is maintained open for those signals $$E < e < E + \gamma$$

by holding off the blocking oscillator until a negative pulse appears at the output of the amplifier 17.

The loop is maintained open for those signals $$e > E + \gamma + 2\epsilon$$

by the proper adjustment of the arm 26 of the potentiometer 22. The potentiometer arm is adjusted so that when $$\delta = -\frac{\gamma}{2}$$

the signal at the potentiometer arm is zero. As stated previously, this signal must be positive in order for the blocking oscillator 30 to fire.

The voltage at the potentiometer arm is zero when $$A\epsilon \frac{x}{2R_1} = (\gamma + \epsilon)\left(\frac{2R_1 - x}{2R_1}\right)$$

where $x$ is the amount of resistance in ohms from the potentiometer arm 26 to the top of potentiometer 22 as shown in FIGURE 1, and $R_1$ is the total resistance value of potentiometer 22.

Solving the above equation for $x$ $$x = \frac{2R_1}{1 + \frac{A\epsilon}{(\gamma+\epsilon)}}$$

It is desired that the voltage at the potentiometer arm be zero when $$\epsilon = \frac{2\gamma}{A-1} \text{ or } \delta = -\frac{\gamma}{2}$$

therefore $$x = \frac{2R_1}{1 + \frac{2\gamma A}{A-1}\cdot\frac{1}{\left(\gamma + \frac{2\gamma}{A-1}\right)}} = \frac{2R_1}{1 + \frac{2A}{1+A}}$$

for $$A \gg 1, \quad x = \frac{2}{3}R_1$$

when $$x = \frac{2}{3}R_1$$

the amplitude of the pulse appearing at the potentiometer arm is zero when $$\delta = -\frac{\gamma}{2}$$

and negative when $$\delta > \left|-\frac{\gamma}{2}\right|$$

In summary—

Closed loop:
$\delta > 0$ when $E+\gamma < e < E+\gamma+\epsilon$
$\delta = 0$ when $e = E+\gamma+\epsilon$
$\delta < 0$ when $E+\gamma+\epsilon < e < E+\gamma+2\epsilon$ Open loop:
$\delta = 0$ when $E+\gamma+2\epsilon < e < E+\gamma$ looking into the output of the gating circuit.

It will be understood that whereas precise adjustment in accordance with the above equations is desirable, some latitude in adjustment is permissible.

It should be noted in particular that $R_1 = R_2$ is not a necessary condition for the satisfactory operation of the circuit, although this assumption has been used throughout to simplify the description and the ensuing analysis.

While the invention has been shown and described with respect to some embodiments thereof which give satisfactory results, it should be understood that changes may be made and equivalents substituted without departing from the spirit and scope of the invention.

I claim as my invention:

1. In pulse amplitude tracking apparatus, in combination, biased means having a signal of recurrent pulses applied thereto, said biased means having a variable biasing potential E applied thereto and passing only the portion of the pulse signal to be tracked which exceeds in amplitude the amplitude E of the biasing potential, the pulse signal while the pulses are of uniform amplitude having a total amplieude $e$, the passed portion of the pulse signal having an amplitude $\gamma+\epsilon$ where $\gamma$ is a constant and $\epsilon$ is the remainder of the portion, error signal obtaining means operatively connected to the biased means for obtaining an error signal which varies in amplitude between predetermined positive and negative amplitude limits and varies in polarity selectively in accordance with changes in the amplitude of the pulse to be tracked above and below a value equal to $E+\gamma+\epsilon$, integrator means operatively connected to the error signal obtaining means, the integrator means having the error signal applied thereto and utilizing the error signal to provide said variable biasing potential, and circuit means connecting the integrator means to the biased means to vary the biasing potential on the biased means in a manner which tends to reduce the error signal to zero.

2. Apparatus according to claim 1 including in addition sweep generator means operatively connected to the error signal obtaining means and to said circuit means, the sweep generator means generating a sweep voltage while the error signal lies outside of said predetermined positive and negative amplitude limits, the sweep voltage being applied to the circuit means, the circuit means utilizing the sweep voltage to periodically vary the value of the biasing potential within predetermined limits including the potential $E = e - (\gamma+\epsilon)$ at which the value of the error signal is reduced to zero.

3. In pulse amplitude tracking apparatus, in combination, biased rectifier means having a signal of recurrent pulses to be tracked applied thereto, the biased rectifier means having a variable biasing potential E applied thereto and passing only the portion of the pulse signal which exceeds in amplitude the amplitude E of the biasing potential, the pulse signal while the pulses are of uniform amplitude having a total amplitude $e$, the passed portion of the pulse signal having an amplitude $\gamma+\epsilon$ where $\gamma$ is a constant and $\epsilon$ is the remainder of the portion, error signal obtaining means operatively connected to said biased rectifier means for obtaining an error signal which varies in polarity selectively in accordance with changes in the amplitude of the pulse to be tracked above and below an amplitude equal to $E+\gamma+\epsilon$, integrator means, a gating circuit connecting the error signal obtaining means to the integrator means for while the signal path through the gating circuit is closed applying the error signal to the integrator means, first circuit means connecting the output of the integrator means to the biased rectifier means for providing the variable biasing potential thereto, the error signal causing the integrator means to vary the value of the biasing potential in a manner which tends to reduce the error signal to zero, a blocking oscillator, second circuit means connecting the blocking oscillator to the error signal obtaining means and to the gating circuit whereby the signal path through the gating circuit is closed by the blocking oscillator to pass the error signal to the integrator means only while the error signal has a value within predetermined positive and negative amplitude limits, and sweep circuit means operatively connected to the blocking oscillator and to the first circuit means for while the error signal is not applied to the integrator means applying a sweep voltage to the first circuit means which causes the value of the biasing potential at the biased rectifier means to sweep between predetermined amplitude limits including the potential $E = e - (\gamma+\epsilon)$ at which the value of the error signal is reduced to zero.

4. In pulse amplitude tracking apparatus, in combination, biased rectifier means having a signal of recurrent pulses to be tracked applied thereto, the biased rectifier means passing only that portion of the pulse signal which exceeds in amplitude the amplitude of the bias potential applied thereto, the pulse signal while the pulses are of uniform amplitude having an amplitude $e = E+\gamma+\epsilon$, where E is the value of the bias potential, $\gamma$ is a constant, and $\epsilon$ is the amplitude of the remaining pulse portion, error signal obtaining means operatively connected to the biased rectifier means for obtaining an error signal which varies in polarity selectively in accordance with changes in the amplitude of the pulse to be tracked above and below a value equal to $E+\gamma+\epsilon$, means including a blocking oscillator operatively connected to the error signal obtaining means and providing a blocking oscillator output while the pulse signal applied to the biased rectifier means has an amplitude which falls between the limits of $E+\gamma$ and $E+\gamma+2\epsilon$, double integrator means, gating circuit means connecting the double integrator means to the error signal obtaining means, the gating circuit means being connected to and controlled by the blocking oscillator and passing the error signal to the double integrator means only while the blocking oscillator is supplying an output, and circuit means connecting said double integrator means to the biased rectifier means for supplying the voltage E thereto, said voltage E varying in a manner which tends to maintain the error signal at zero.

5. Apparatus according to claim 4 including in addition sweep generating means operatively connected to the blocking oscillator and to the circuit means, the sweep generating means providing a sweep voltage to the circuit means while the blocking oscillator is not providing an output, the sweep voltage applied by the circuit means to the biased rectifier means sweeping the value of the voltage E between predetermined limits to thereby pick up the pulse signal to be tracked.

6. In pulse amplitude tracking apparatus in combination, biased rectifier means having a signal of recurrent pulses to be tracked applied thereto, the biased rectifier means having a variable biasing potential E applied thereto and passing only the portion of the pulse signal which exceeds in amplitude the amplitude of the biasing potential, the portion of the pulse signal to be tracked passed by the biased rectifier means having an amplitude $\gamma + \epsilon$ where the total amplitude of the pulse signal has a value $e = E + \gamma + \epsilon$ and $\gamma$ is a constant, a summing and phase inverting amplifier having a direct current potential with a value equal to $\gamma$ applied thereto and having the output of the biased rectifier means applied thereto, said summing amplifier providing an output having a value corresponding to $-A\epsilon$ where A is the gain of summing amplifier, summing circuit means connected to the biased rectifier means and to the summing amplifier for obtaining an error signal, said summing circuit means having the output of the summing amplifier applied thereto coincidentally with the output of the biased rectifier means, integrator means connected to the biased rectifier means and supplying the potential E thereto, gating circuit means connecting the summing circuit means to the integrator means, the error signal varying in polarity selectively in accordance with changes in the amplitude of the pulse to be tracked above and below a value equal to $E + \gamma + \epsilon$, the error signal while applied to the integrator means causing the integrator means to vary the value of potential E in a manner which tends to restore the error signal to zero, and other circuit means operatively connecting the gating circuit means to the summing circuit means for causing the gating circuit means to apply the error signal to the integrator means only while the error signal has an amplitude which falls between predetermined positive and negative potential limits.

7. Apparatus according to claim 6 including in addition sweep circuit means operatively connected to the integrator means and to the summing circuit means, the sweep circuit means generating a sweep voltage while the error signal is not applied to the integrator means, the integrator means utilizing the sweep voltage to cause the value of the biasing potential E applied to the biased rectifier means to sweep between predetermined value limits including the value $E = e - (\gamma + \epsilon)$.

8. In pulse amplitude tracking apparatus, in combination, input lead means, a biased diode connected to said input lead means and having a signal of recurrent pulses to be tracked applied thereto, the pulses of the signal to be tracked while the signal is of constant amplitude having an amplitude $e = E + \gamma + \epsilon$ where $\gamma$ is a constant and E is the value of the biasing potential on the diode, circuit means for biasing the diode with said voltage E, error signal obtaining means operatively connected to the biased diode for obtaining a delayed error signal which varies in polarity selectively in accordance with changes in the amplitude of the pulse to be tracked above and below the amplitude $E + \gamma + \epsilon$, pulse obtaining means connected to said biased diode for obtaining a positive pulse whenever the amplitude $e$ of the input pulses has a value between E and $E + \gamma + 2\epsilon$, other pulse obtaining means for obtaining a negative pulse whenever the amplitude $e$ of the input pulses exceeds $E + \gamma$, an "and" circuit having said positive and negative pulses applied thereto and constructed and arranged to provide an output when both of said positive and negative pulses are applied thereto in time coincidence, a blocking oscillator having the output of the "and" circuit applied thereto and producing a gating pulse upon the application thereto of an output from the "and" circuit, double integrator means, gating circuit means having said gating pulse applied thereto, said gating circuit means operatively connecting the error signal obtaining means to the double integrator means and passing the error signal to the double integrator means upon coincidence of the error signal with the gating pulse from the blocking oscillator, and means operatively connecting said double integrator means to said circuit means for applying to the biased diode said aforementioned variable potential E, said double integrator means utilizing the error signal to maintain the potential E at a value which tends to reduce the error signal to zero.

9. Pulse amplitude tracking apparatus according to claim 8 including in addition sweep generator means operatively connected to the circuit means and to the blocking oscillator, said sweep generator means generating a sweep voltage while no output is applied thereto from the blocking oscillator, the sweep voltage causing the value of biasing potential at the biased diode to be swept over a predetermined amplitude range including the amplitude portion E of a pulse to be selected and tracked, where $E = e - (\gamma + \epsilon)$.

10. In pulse amplitude tracking apparatus, in combination, biased means having a signal of recurrent pulses to be tracked applied thereto, the pulses of the signal to be tracked having an instant pulse amplitude $e$, means for applying a biasing potential to the biased means having a value E equal to a variable portion of the pulse amplitude $e$, the biased means passing only the portion of the pulse signal which exceeds in amplitude the biasing potential E, means for obtaining voltages corresponding to the quantities $\gamma$ and $\gamma + \epsilon$ where $\gamma$ is constant and $\gamma$ plus $\epsilon$ represents the difference in the amplitude $e$ over the amplitude E, means for obtaining an error signal having an amplitude proportional to the deviation of $e$ from the value corresponding to $E + \gamma + \epsilon$ where E is the instant value of the biasing potential, pulse obtaining means for obtaining a positive pulse whenever the amplitude of the input pulses has a value between E and $E + \gamma + 2\epsilon$, other pulse obtaining means for obtaining a negative pulse whenever the amplitude of the input pulses exceeds $E + \gamma$, an "and" circuit having said positive and negative pulses applied thereto and providing an output when both of said positive and negative pulses are applied thereto in time coincidence, a blocking oscillator having the output of the "and" circuit applied thereto and producing a gating pulse upon the application thereto of an output from the "and" circuit, double integrator means, and gating circuit means operatively connected to the blocking oscillator to be gated by the output thereof, said gating circuit means connecting the error signal obtaining means to the double integrator means and passing the error signal to the double integrator means upon coincidence of said error signal with the gating pulse from the blocking oscillator, said double integrator means being operatively connected to said biased means for applying thereto said aforementioned variable voltage E, said voltage E varying in a manner which tends to maintain the error signal at zero amplitude.

11. In a pulse amplitude tracking circuit, in combination, biased rectifier means having a signal of recurrent pulses to be tracked applied thereto, the biased rectifier means having a variable biasing potential E applied thereto and passing only the portion of the pulses which exceeds in amplitude the amplitude of the biasing potential, and servo means including error signal obtaining means operatively connected to the biased rectifier means, the obtained error signal having a value which varies in polarity and amplitude in accordance with variations in the amplitude of the pulses to be tracked from an amplitude $e$ corresponding to $e=E+\gamma+\epsilon$ where $\gamma$ is a constant, said servo means including means for varying the bias potential E on the biased rectifier means in a manner which tends to maintain a predetermined constant difference substantially equal to $\gamma+\epsilon$ between the amplitude of the pulse signal and the amplitude of the biasing potential.

References Cited

UNITED STATES PATENTS 2,465,191   3/1949   Borden et al. _____ 324—99

RODNEY D. BENNETT, Jr., Primary Examiner

HERBERT C. WAMSLEY, Assistant Examiner

U.S. Cl. X.R.

324—99; 328—165, 168